(12) United States Patent
Sun

(10) Patent No.: US 9,452,536 B2
(45) Date of Patent: Sep. 27, 2016

(54) PICK-AND-PLACE DEVICE FOR GLASS SUBSTRATE

(71) Applicant: Shenzhen China Star Optoelectronics Technology Co., Ltd., Guangdong (CN)

(72) Inventor: Shih Ying Sun, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 14/389,881

(22) PCT Filed: Jul. 24, 2014

(86) PCT No.: PCT/CN2014/082943
§ 371 (c)(1),
(2) Date: Aug. 25, 2015

(87) PCT Pub. No.: WO2016/004655
PCT Pub. Date: Jan. 14, 2016

(65) Prior Publication Data
US 2016/0008986 A1 Jan. 14, 2016

(30) Foreign Application Priority Data
Jul. 8, 2014 (CN) .......................... 2014 1 0321724

(51) Int. Cl.
*B25J 15/06* (2006.01)
*B25J 15/00* (2006.01)
*B65G 49/06* (2006.01)

(52) U.S. Cl.
CPC ............. *B25J 15/0028* (2013.01); *B25J 15/00* (2013.01); *B25J 15/0616* (2013.01); *B65G 49/061* (2013.01); *B65G 49/065* (2013.01); *B65G 49/067* (2013.01); *B65G 49/068* (2013.01); *B65G 2249/04* (2013.01)

(58) Field of Classification Search
CPC .. B25J 15/0028; B25J 15/00; B25J 15/0616; B25J 15/0052; B25J 15/0066; B25J 15/06; B65G 49/061; B65G 49/065; B65G 49/067; B65G 49/068; B65G 2249/04; B25F 1/00; B25F 1/02
USPC ....................... 294/185, 119.1, 103.1, 213, 2
See application file for complete search history.

(56) References Cited

U.S. PATENT DOCUMENTS

| 5,085,329 | A | | 2/1992 | Crowell et al. | |
|---|---|---|---|---|---|
| 6,152,507 | A | * | 11/2000 | Pirker | B65G 47/911 294/119.1 |
| 6,167,322 | A | * | 12/2000 | Holbrooks | H01L 21/67259 294/103.1 |
| 6,256,555 | B1 | * | 7/2001 | Bacchi | H01L 21/68707 294/185 |

(Continued)

FOREIGN PATENT DOCUMENTS

| CN | 102897507 | | 1/2013 | | |
|---|---|---|---|---|---|
| CN | 202952273 | | 5/2013 | | |
| DE | 102008026506 | A1 * | 12/2009 | ............ | B25J 13/088 |
| EP | 2279959 | | 2/2011 | | |

(Continued)

*Primary Examiner* — Gabriela Puig

(57) ABSTRACT

A pick-and-place device for a glass substrate is provided. The pick-and-place device has a loading bracket for loading the glass substrate, at least one first stopper immovably disposed on the loading bracket, and a plurality of second stoppers movably disposed on the loading bracket. The first stopper is used for a datum orientation with the glass substrate; and the second stopper is used to fix the glass substrate. Therefore, the shifting deviation risk of the glass substrate is decreased, and it can reduce the broken risk of the glass substrate, so as to lower the production cost.

18 Claims, 5 Drawing Sheets

(56) References Cited

U.S. PATENT DOCUMENTS

| | | | |
|---|---|---|---|
| 8,702,142 B2 * | 4/2014 | Kim | H01L 21/68707 294/103.1 |
| 2003/0120387 A1 * | 6/2003 | Sherwin | B25J 15/0052 700/245 |
| 2014/0131168 A1 | 5/2014 | Guo et al. | |

FOREIGN PATENT DOCUMENTS

| | | | |
|---|---|---|---|
| JP | 2005-317854 | 11/2005 | |
| WO | WO 2010/109923 | 9/2010 | |
| WO | WO 2012/056985 | 5/2012 | |
| WO | WO 2013150650 A1 * | 10/2013 | B25J 15/0052 |

* cited by examiner

PICK-AND-PLACE DEVICE FOR GLASS SUBSTRATE

RELATED APPLICATIONS

This application is a National Phase of PCT Patent Application No. PCT/CN2014/082943 having International filing date of Jul. 24, 2014, which claims the benefit of priority of Chinese Patent Application No. 201410321724.6 filed on Jul. 8, 2014. The contents of the above applications are all incorporated by reference as if fully set forth herein in their entirety.

FIELD OF THE INVENTION

The present invention relates to the technical field of liquid crystal displays, and more particularly to a pick-and-place device for a glass substrate.

BACKGROUND OF THE INVENTION

In the manufacture of liquid crystal displays, it is necessary to transfer a glass substrate from a cassette to a production line, and execute a wanted manufacture process. Furthermore, in the transfer process, the glass substrate loaded in the cassette is picked from the cassette for a sampling inspection, and then is placed back to the cassette after it is qualified by the sampling inspection.

However, generally speaking, the glass substrate is usually 0.4-0.7 mm in thickness, and is fragile, so that the glass substrate is easily broken in the loading or unloading process thereof. If the placed position of the glass substrate on the cassette is incorrect, then the glass substrate is more easily broken when it is loaded/unloaded from the cassette. Referring now to FIGS. 1a to 1d, which show several incorrect placement situations of a glass substrate on a cassette, wherein FIG. 1a is a schematic view showing a glass substrate which is slanted to the left side; FIG. 1b is a schematic view showing a glass substrate which is slanted to the right side; FIG. 1c is a schematic view showing a glass substrate which is slanted to the outside; and FIG. 1d is a schematic view showing a glass substrate which is slanted and rotated. Additionally, some problems, such as shaking and unstable airflow, easily happen during the transfer process, which can cause the glass substrate to be dropped and broken. That is, in the traditional technology, since the placement precision of the glass substrate is low, the glass substrate is easily broken when it is picked/placed, and costs are increased.

As a result, it is necessary to provide a pick-and-place device for a glass substrate to solve the above-mentioned problems.

SUMMARY OF THE INVENTION

The object of the present invention is to provide a pick-and-place device for a glass substrate, which can decrease the shifting deviation risk of the glass substrate, and reduce the broken risk of the glass substrate, so as to lower production cost.

For solving the above-mentioned problems, the technical solution of preferred embodiments of the present invention is as follows:

A pick-and-place device for glass substrate, comprising: a base bracket; a loading part disposed on the base bracket; wherein the loading part comprises: a loading bracket; at least one first stopper immovably disposed on the loading bracket; and a plurality of second stoppers movably disposed on the loading bracket, wherein a telescopic structure is disposed on the second stoppers;

wherein the quantity of the first stoppers and the second stoppers is at least four; the loading bracket is used to load the glass substrate; the first stopper is used for a datum orientation with the glass substrate on the loading bracket; and the second stoppers are used to fix the glass substrate on the loading bracket by the telescopic structure extending or retracting and moving on the loading bracket.

In the above-mentioned pick-and-place device for the glass substrate, the loading bracket is provided with a plurality of air cushions, and the air cushions are used to suck and fix the glass substrate when picking or placing the glass substrate.

In the above-mentioned pick-and-place device for the glass substrate, the air cushions are further used to form an air suspension between the glass substrate and the loading bracket when the second stoppers move on the loading bracket.

In the above-mentioned pick-and-place device for the glass substrate, the loading bracket is arranged as two loading arms, and one end of each of the two loading arms close to the base bracket is provided with one of the first stoppers, and the other end thereof is correspondingly provided with one of the second stoppers.

In the above-mentioned pick-and-place device for the glass substrate, the second stoppers disposed on the corresponding end opposite to the first stoppers are used to fix the glass substrate on the loading arms by a movement in a parallel direction of the loading arms.

In the above-mentioned pick-and-place device for the glass substrate, both of the two loading arm are provided with the air cushions, and the air cushions are equidistantly disposed between the first stopper and the second stopper corresponding to the first stopper.

In the above-mentioned pick-and-place device for the glass substrate, each side of the two loading arms close to the left or right edges of the glass substrate is correspondingly provided with the second stoppers.

In the above-mentioned pick-and-place device for the glass substrate, the second stoppers disposed on the side edges of the loading arms are used to fix the glass substrate on the loading arms by a movement in a perpendicular direction to that of the loading arms.

In the above-mentioned pick-and-place device for the glass substrate, when each side of the two loading arms is provided with one of the second stoppers, the second stoppers are disposed on the middle of the first stopper and the second stopper corresponding to the first stopper.

In the above-mentioned pick-and-place device for the glass substrate, when each sides of the two loading arms is provided with at least two of the second stoppers, the second stoppers are equidistantly disposed between the first stopper and the second stopper corresponding to the first stopper.

A pick-and-place device for a glass substrate, comprising: a base bracket; a loading part disposed on the base bracket; wherein the loading part comprises: a loading bracket; at least one first stopper immovably disposed on the loading bracket; and plurality of second stoppers movably disposed on the loading bracket;

wherein the quantity of the first stoppers and the second stoppers is at least four; the loading bracket is used to load the glass substrate; the first stopper is used for a datum orientation with the glass substrate on the loading bracket;

and the second stoppers are used to fix the glass substrate on the loading bracket by the second stoppers moving on the loading bracket.

In the above-mentioned pick-and-place device for the glass substrate, the loading bracket is provided with a plurality of air cushions, and the air cushions are used to suck and fix the glass substrate when picking or placing the glass substrate.

In the above-mentioned pick-and-place device for the glass substrate, the air cushions are further used to form an air suspension between the glass substrate and the loading bracket when the second stoppers move on the loading bracket.

In the above-mentioned pick-and-place device for the glass substrate, the loading bracket is arranged as two loading arms, and one end of each of the two loading arms close to the base bracket is provided with one of the first stoppers, and the other end thereof is correspondingly provided with one of the second stoppers.

In the above-mentioned pick-and-place device for the glass substrate, the second stoppers disposed on the corresponding end opposite to the first stoppers are used to fix the glass substrate on the loading arms by a movement in a parallel direction of the loading arms.

In the above-mentioned pick-and-place device for the glass substrate, both of the two loading arm are provided with the air cushions, and the air cushions are equidistantly disposed between the first stopper and the second stopper corresponding to the first stopper.

In the above-mentioned pick-and-place device for the glass substrate, each side of the two loading arms close to the left or right edges of the glass substrate is correspondingly provided with the second stoppers.

In the above-mentioned pick-and-place device for the glass substrate, the second stoppers disposed on the side edges of the loading arms are used to fix the glass substrate on the loading arms by a movement in a perpendicular direction to that of the loading arms.

In the above-mentioned pick-and-place device for the glass substrate, when each side of the two loading arms is provided with one of the second stoppers, the second stoppers are disposed on the middle of the first stopper and the second stopper corresponding to the first stopper.

In the above-mentioned pick-and-place device for the glass substrate, when each sides of the two loading arms is provided with at least two of the second stoppers, the second stoppers are equidistantly disposed between the first stopper and the second stopper corresponding to the first stopper.

Hence, compared with the existing technology, in the pick-and-place device for the glass substrate of the present invention, the first stopper and the second stopper are added for adjusting the glass substrate, and it is possible to first confirm a position of the glass substrate on the loading arms, and then turn on the vacuum. Therefore, the risk of shifting deviation of the glass substrate is decreased, and the broken risk of the glass substrate is reduced, thereby lowering the cost.

Below, with reference to the accompanying drawings, the specific embodiments of the present invention are further described, so that aspects of the present invention and the beneficial effects thereof are more clearly defined.

DETAILED DESCRIPTION OF THE PREFERRED EMBODIMENTS

Please refer to the drawings, wherein the same symbols representing like components are used to represent the principles of the present invention implemented in a suitable computing environment as examples. The following description is based on the specific illustrated embodiment of the present invention, which should not be construed as limiting the unillustrated embodiment of the present invention.

Figure 1A:
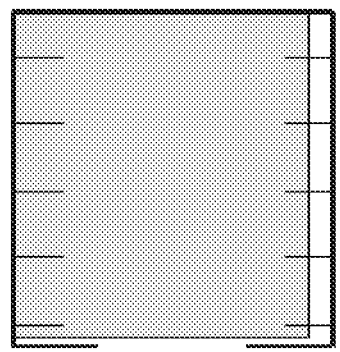
FIGS. 1a to 1d are schematic views showing incorrect placements of a glass substrate in a cassette.
Figure 1B:
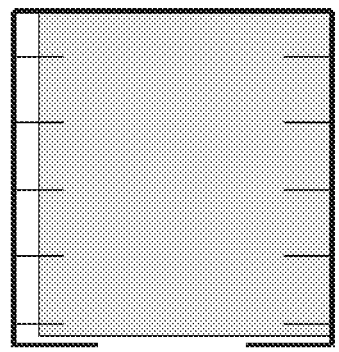
Figure 1C:
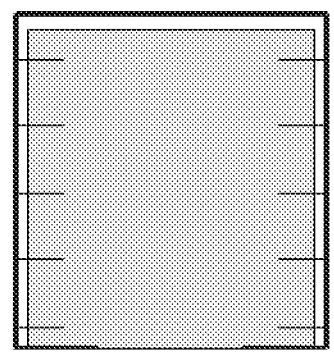
Figure 1D:
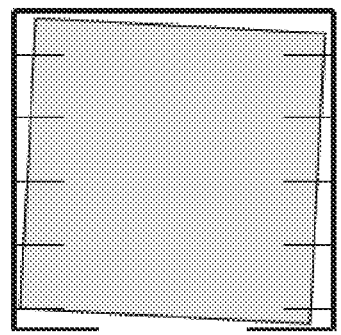
Figure 2:
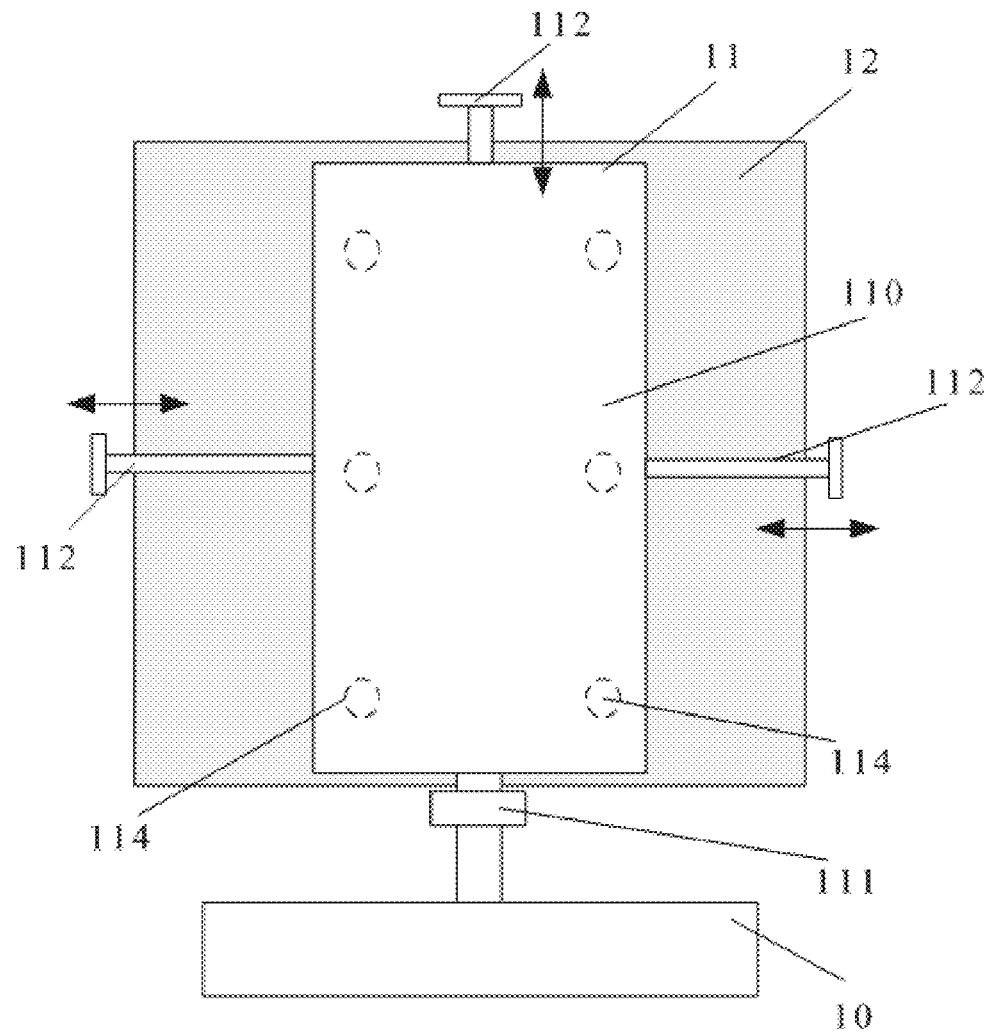
FIG. 2 is a structural schematic view of a pick-and-place device for a glass substrate of the present invention.

Referring now to FIG. 2, which is a structural schematic view of a pick-and-place device for a glass substrate of the present invention, wherein the pick-and-place device for a glass substrate comprises: a base bracket 10 and a loading part 11 disposed on the base bracket 10.

The loading part 11 comprises a loading bracket 110 and a plurality of first and second stoppers, wherein the first stopper 111 is immovably disposed on the loading bracket 110; the second stopper 112 is movably disposed on the loading bracket 110; and the quantity of the first stoppers 111 and the second stoppers 112 is at least four.

Moreover, the loading bracket 110 is used to load a glass substrate 12. The first stopper 111 is used for a datum orientation with the glass substrate 12 on the loading bracket 110.

The second stopper 112 is used to fix the glass substrate 12 on the loading bracket 110 by moving on the loading bracket 110.

It should be understood that the stoppers disposed on the loading bracket 110 comprise the first stopper 111 and the second stopper 112, and the quantity of the first stoppers 111 and the second stoppers 112 is at least four. Preferably, as shown in FIG. 2, the stoppers can be disposed on the four edges of the loading bracket 110, and in the at least four stoppers, at least one of the first stoppers 111 is included.

Preferably, as shown in FIG. 2, each of the edges of the loading bracket 110 is provided with one stopper, wherein one end of each of the first stoppers 111 is disposed on the edge closest to the base bracket 10, and three of the second stoppers 112 are disposed on the other edges of the loading bracket 110.

After the glass substrate 12 is placed on the loading bracket 110, the glass substrate 12 can be orientated based on the first stopper 111, and then the second stoppers 112 can be moved toward the glass substrate 12, namely inward, so as to fix the glass substrate 12 on the loading bracket 110. Conversely, if the glass substrate 12 is to be picked from the loading bracket 110, the second stopper 112 can be moved far away from the glass substrate 12, namely outward, so as to achieve unloading the glass substrate 12. In FIG. 2, there are arrows indicating the movement directions of the second stoppers 112.

Preferably, as shown in FIG. 2, the loading bracket 110 is provided with a plurality of air cushions 114, and the air cushions 114 are used to suck and fix the glass substrate 12 when picking/placing the glass substrate 12. That is, the air cushions 114 are used to be vacuum pads when picking/placing the glass substrate 12. The glass substrate 12 can be fixed by the sucking function of the vacuum pads before it is fixed by the stoppers, so as to avoid the glass substrate 12 being dropped.

Furthermore, preferably, the air cushions 114 are used to form an air suspension between the glass substrate 12 and the loading bracket 110 when the second stoppers 112 move onto the loading bracket 110. The second stoppers 112 are moved on the loading bracket 110, and thereby it is possible to drive the glass substrate 12 to be moved together therewith, so that in this moment, the sucking function thereof turned off, and are used as air suspension cushions. That is, by a thin air layer formed between the air suspension cushions and plane, the thickness of the thin air layer is 1 mm or less, and a sliding condition of non-friction is established, so as to avoid the glass substrate 12 being scratched.

Figure 3:
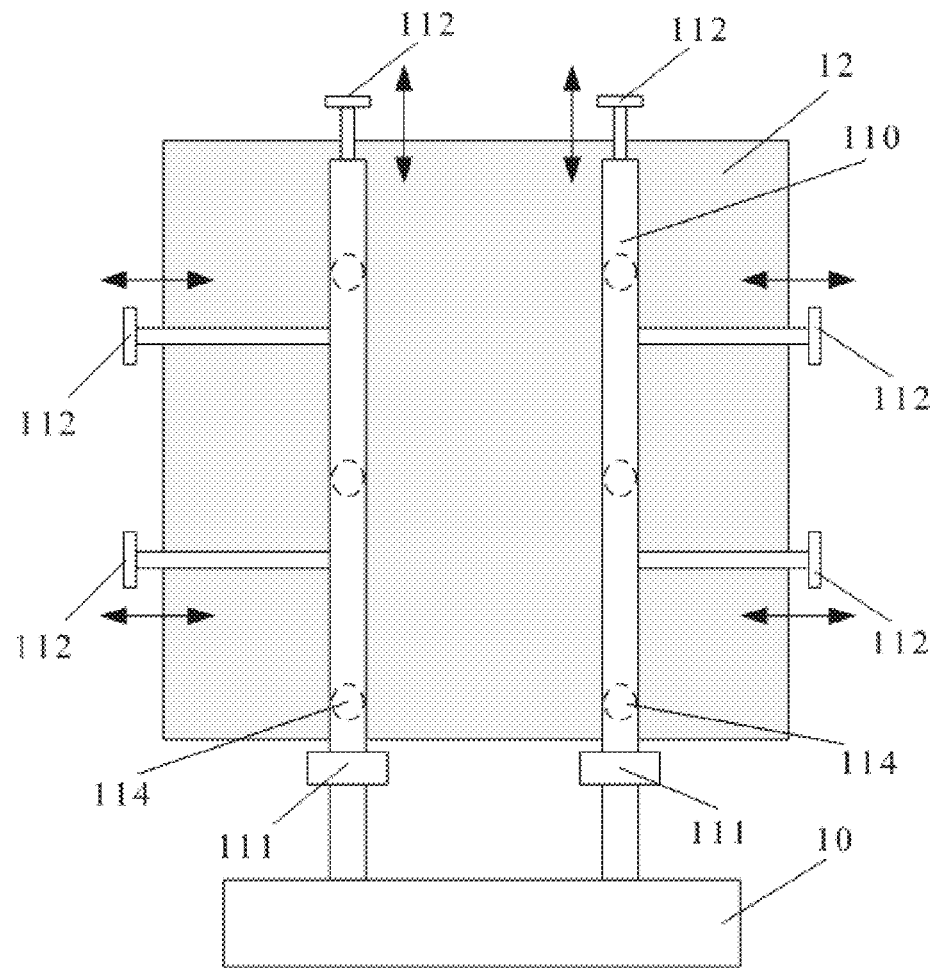
FIG. 3 is a structural schematic view of another pick-and-place device for a glass substrate of the present invention.

Preferably, in order to save the cost of the loading bracket 110, the loading bracket 110 can be arranged as two loading arms. Referring now to FIG. 3, which is a structural schematic view of another pick-and-place device for a glass substrate of the present invention.

Preferably, a loading bracket 110 is arranged as two loading arms, wherein each end of the two loading arms close to the base bracket 10 is provided with one of the first stoppers 111, and the other end thereof is correspondingly provided with one of the second stoppers 112. Furthermore, each side of the two loading arms close to the edges of the glass substrate 12 is correspondingly provided with the second stoppers 112. As shown in FIG. 3, each outer side of the two loading arms is provided with two of the second stoppers 112.

Figure 4:
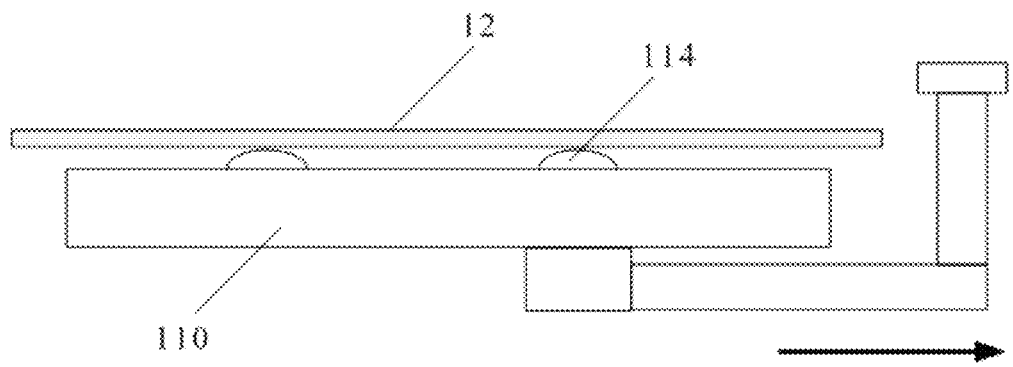
FIG. 4 is a schematic side view of the pick-and-place device for the glass substrate of the present invention.
Figure 5:
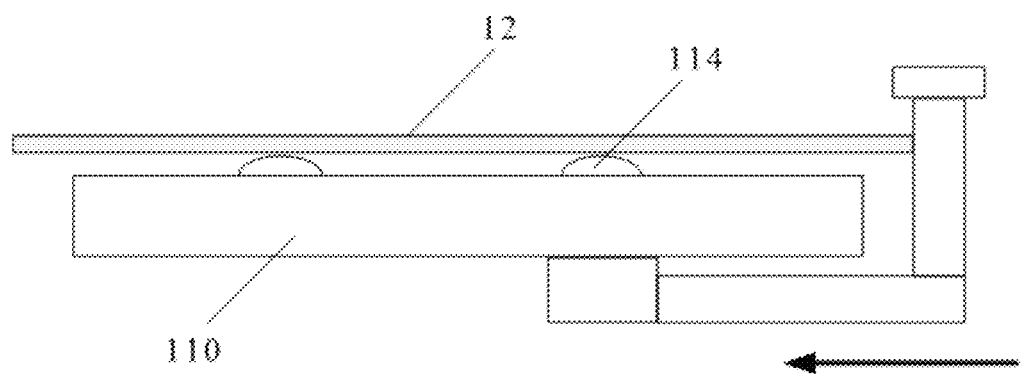
FIG. 5 is another schematic side view of the pick-and-place device for the glass substrate of the present invention.

Referring now to FIGS. 4 and 5, which are schematic side views of the pick-and-place device for a glass in FIG. 3.

Preferably, the profile of the second stoppers 112 can be formed as an L-shape, wherein the end of the long side thereof is connected with the loading arm. Simultaneously, referring to FIG. 3, the long side thereof is perpendicular to the loading arm.

Furthermore, the long side of the second stoppers 112 is provided with a telescope structure.

When the long side of the second stoppers 112 is telescopically moved by the telescope structure, a short side of the second stoppers 112 is moved alone the moving direction of the telescope structure. As shown in FIG. 4, before the glass substrate 12 is placed on the loading arms, the telescope structure of the second stoppers 112 and the short side connected therewith are extended outwards. As shown in FIG. 5, after the glass substrate 12 is placed on the loading arms, the telescope structure of the second stoppers 112 and the short side connected therewith are retracted inwards until the short side of the second stopper 112 contacts the glass substrate 12. In FIGS. 4 and 5, there are arrows indicating the moving directions of the second stoppers 112.

That is, the second stoppers 112 disposed on the corresponding end opposite to the first stopper 111 are used to fix the glass substrate 12 on the loading arms by a movement in a parallel direction to that of the loading arms; and the second stoppers 112 disposed on the side edges of the loading arms are used to fix the glass substrate 12 on the loading arms by a movement in a perpendicular direction to that of the loading arms.

It is necessary to explain that the profiles of the second stoppers 112 in the preferred embodiments of the present invention can be a non-standard L-shape. For example, an oblique angle can be between the long side and short side (they can be connected with a non-right angle), or a stopping block can disposed on the end of the short side to further avoid the glass substrate 12 being dropped, and the above-mentioned shapes do not influence the function of the second stoppers 112.

It is easily understood that since FIGS. 4 and 5 show a single second stopper 112, all of the second stoppers 112 disposed on the corresponding end opposite to the first stopper 111 or on the left side edges of the loading arms can be in the same installation, this is not discussed here.

Specifically, the telescope structure disposed inside the long side of the second stoppers 112 can be installed such as below structures, so as to achieve a movement of the second stoppers 112.

Figure 6:
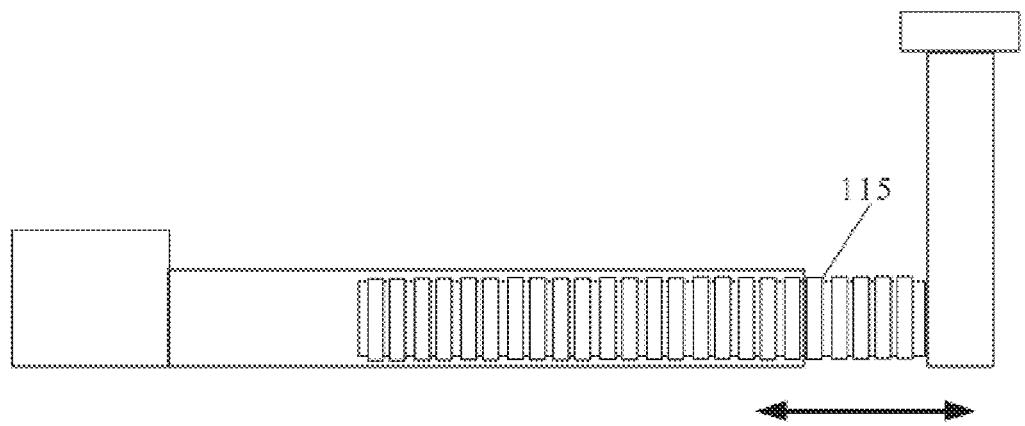
FIG. 6 is a structural schematic view of a second stopper of the present invention.

Referring now to FIG. 6, which is a structural schematic view of a telescopic structure, wherein the numeral 115 indicates the telescopic structure. The telescopic structure 115 is disposed inside the long side of the second stoppers 112, and is formed as a screw thread. Furthermore, the internal part of the long side of the second stoppers 112 is also formed as a screw thread co-operating with the telescopic structure 115.

By using an external tool, such as a wrench, to drive the telescopic structure 115, the telescopic structure 115 can be rotated and moved inside the long side under external force, thereby driving the short side of the second stoppers 112 to be moved. In FIG. 6, there is an arrow indicating the movement directions of the telescopic structure 115.

Figure 7:
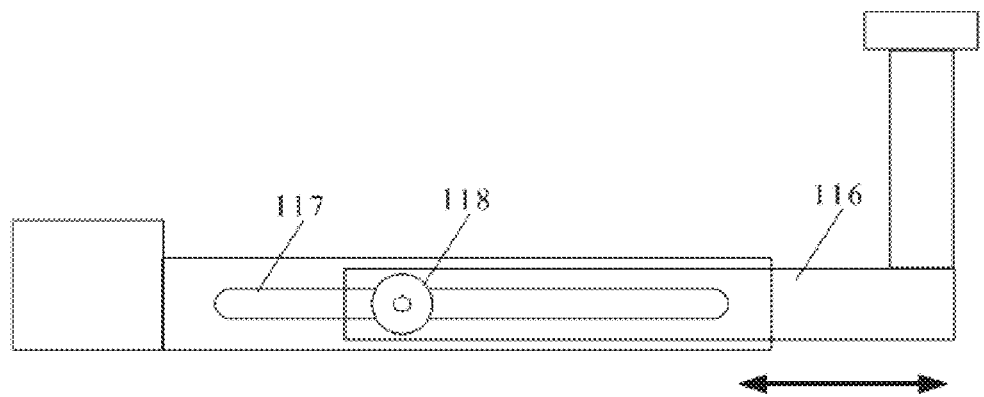
FIG. 7 is another structural schematic view of the second stopper of the present invention.

Referring now to FIG. 7, which is another structural schematic view of a telescopic structure, wherein the numeral 116 indicates the telescopic structure. The telescopic structure 116 is disposed inside the long side of the second stoppers 112, wherein the long side is provided with a level guide slot 117, and the telescopic structure 116 is provided with a sliding pin 118, so that the sliding pin 118 can slide in the level guide slot 117.

By the sliding pin 118 co-operating with the level guide slot 117, the telescopic structure 116 can be moved under the limit of the sliding pin 118, and drive the short side of the second stoppers 112 to be moved. In FIG. 7, there is an arrow indicating the movement directions of the telescopic structure 116.

When the telescopic structure 116 arrives at the user's desired position, a fastener can be used to fix the telescopic structure 116, such as pull fastener or clip fastener; it is not specifically limited herein.

It is easily understood by the displace principle that it is possible to dispose the level guide slot 117 on the telescopic structure 116, and the sliding pin 118 on the long side of the second stoppers 112. The operation principle thereof can be referred to the above description; it is not specifically described here.

It should be understood that FIGS. 6 and 7 are only used to explain the preferred embodiments, but not be a limit to the present invention.

As shown in FIG. 3, both of the two loading arm are provided with the air cushions 114, and the air cushions 114 are equidistantly disposed between the first stopper 111 and the second stopper 112 corresponding to the first stopper 111. In the preferred embodiment, each of the loading arm is provided with three of the air cushions 114, but the number thereof is not limited here.

Furthermore, the number of the second stoppers 112 of the loading bracket 110 is dependent upon the size of the glass substrate. For a loaded glass substrate of G3.5, each of the left and right sides of the two loading arms is provided with one of the second stoppers 112, wherein the second stopper 112 is disposed in the middle of the first stopper 111 and the second stopper 112 corresponding to the first stopper 111.

For a loaded glass substrate of G5 or more, each of the left and right sides of the two loading arms is provided with at least two of the second stoppers 112, wherein the second stopper 112 is equidistantly disposed between the first stopper 111 and the second stopper 112 corresponding to the first stopper 111.

For better achieving the pick-and-place device for glass substrate of the present invention, according to the pick-and-place device for the glass substrate shown in FIG. 3, a pick-and-place method for a glass substrate is simply explained as follows:

In the first step, the loading arm picks the glass substrate from a cassette/machine; to prevent the glass substrate from sliding when the loading arms are moved, the air cushions 114 are turned on to a vacuum function to fix the glass substrate.

In the second step, when the loading arms arrives at a target position, the air cushions 114 are turned off from the vacuum function and changed to an air suspension function, and then the glass substrate is adjusted and oriented by the first stopper 111 and the second stoppers 112.

Third step, when the adjustment is finished and the second stoppers 112 do not depart from the glass substrate, the air cushions 114 are turned on to the vacuum function to fix the glass substrate again.

In the fourth step, after turning on the vacuum function, the second stoppers 112 are loosened and return to an original position, so that the pick/place operation of the loading arms is finished.

As mentioned above, the pick-and-place device for glass substrate of the present invention can improve a shifting deviation thereof. If the loading arms are not provided with an adjustment structure (the first stopper 111 and the second stoppers 112), then the deviation of picking/placing glass substrate is between 1 mm to 2 mm. The reason thereof is that the glass substrate has a moving risk if the vacuum function of the loading arms is not turned on while packing the glass substrate. In the present invention, since the first stopper 111 and the second stoppers 112 are added for adjusting the glass substrate, it is possible to first confirm a position of the glass substrate on the loading arms, and then turn on the vacuum. Therefore, the shifting deviation risk of the glass substrate is decreased, and it can reduce the broken risk of the glass substrate, so as to lower the costs.

In the above embodiments, the description of the various embodiments has focused on a certain embodiment is not described in detail section, you can see the relevant description in other embodiments, not mentioned here.

Those skilled in the art will recognize that, with reference to the words used herein, "preferably" means serving as an example, a sample, or an illustration. Text described as "preferred" any aspect or design necessarily to be construed as advantageous over other aspects or designs. In contrast, the term "preferred", is meant in particular the way the concept. As used herein, the term "or" is intended to mean containing "or" not exclude "or." That is, unless specified otherwise, or clear from the context, "X employs 101 or 102" means an arrangement of any nature, including. That is, if X employs 101; X employs 102; or X employs both 101 and 102, then "X employs 101 or 102" is met in any of the foregoing examples.

Moreover, despite being relative to one or more implementations shown and described the present disclosure, those skilled in the art based on the present specification and drawings will occur upon reading and understanding the equivalent variations and modifications. The present disclosure includes all such modifications and variations, and is only limited by the scope of the appended claims. Particularly, with regard to the various functions performed by the above-described components (e.g., elements, resources, etc.), the terms used to describe such components are intended to perform the function corresponding to the specified component (e.g., which is functionally equivalent) of any of the components (unless otherwise indicated), even if the structure of the implementation and execution of the function of the present disclosure shown herein disclosed exemplary not structurally equivalent. Additionally, although a particular feature of the present disclosure has been made with respect to certain implementations, only one is open, but this feature may be as given or particular application and the purpose of enabling a desired one or more other implementations Other combinations of features. Moreover, the terms "comprising,", "having,", "containing," or variants thereof are used in the detailed description or the claims, such a term is intended to be used in a manner similar to the term "comprising"

Although the present invention has been disclosed in the preferred embodiments described above, the foregoing preferred embodiments are not intended to limit the present invention. One of ordinary skill in the art, without departing from the spirit and scope of the present invention within, may implement various modifications and variations, so the scope of the protection of the invention as defined in the claims will prevail.

What is claimed is:

1. A pick-and-place device for a glass substrate, comprising:
   a base bracket;
   a loading part disposed on the base bracket;
   wherein the loading part comprises: a loading bracket; at least one first stopper immovably disposed on the loading bracket; and a plurality of second stoppers movably disposed on the loading bracket, wherein a telescopic structure is disposed on the second stoppers;
   wherein the loading bracket is arranged as two loading arms, and one end of each of the two loading arms close to the base bracket is provided with one of the first stoppers, and the other end thereof is correspondingly provided with one of the second stoppers;
   wherein the quantity of the first stoppers and the second stoppers is at least four; the loading bracket is used to load the glass substrate; the first stopper is used for a datum orientation with the glass substrate on the loading bracket; and the second stoppers are used to fix the glass substrate on the loading bracket by the telescopic structure extending or retracting on the loading bracket.

2. The pick-and-place device for the glass substrate according to claim 1, wherein the loading bracket is provided with a plurality of air cushions, and the air cushions are used to suck and fix the glass substrate when picking or placing the glass substrate.

3. The pick-and-place device for the glass substrate according to claim 2, wherein the air cushions are further used to form an air suspension between the glass substrate and the loading bracket when the second stoppers move on the loading bracket.

4. The pick-and-place device for the glass substrate according to claim 1, wherein the second stoppers disposed on the corresponding end opposite to the first stoppers are used to fix the glass substrate on the loading arms by a movement in a parallel direction of the loading arms.

5. The pick-and-place device for the glass substrate according to claim 4, wherein each side of the two loading arms is provided with one of the second stoppers, which is disposed on the middle of the first stopper and the second stopper corresponding to the first stopper.

6. The pick-and-place device for the glass substrate according to claim 4, wherein each side of the two loading arms is provided with at least two of the second stoppers, and the second stoppers are equidistantly disposed between the first stopper and the second stopper corresponding to the first stopper.

7. The pick-and-place device for the glass substrate according to claim 1, wherein both of the two loading arm are provided with the air cushions, and the air cushions are equidistantly disposed between the first stopper and the second stopper corresponding to the first stopper.

8. The pick-and-place device for the glass substrate according to claim 1, wherein each side of the two loading arms close to the left or right edges of the glass substrate is correspondingly provided with the second stoppers.

9. The pick-and-place device for the glass substrate according to claim 8, wherein the second stoppers disposed on the side edges of the loading arms are used to fix the glass substrate on the loading arms by a movement in a perpendicular direction to that of the loading arms.

10. A pick-and-place device for a glass substrate, comprising:
    a base bracket;
    a loading part disposed on the base bracket;
    wherein the loading part comprises: a loading bracket; at least one first stopper immovably disposed on the loading bracket; and a plurality of second stoppers movably disposed on the loading bracket;
    wherein the loading bracket is arranged as two loading arms, and one end of each of the two loading arms close to the base bracket is provided with one of the first stoppers, and the other end thereof is correspondingly provided with one of the second stoppers;
    wherein the quantity of the first stoppers and the second stoppers is at least four; the loading bracket is used to load the glass substrate; the first stopper is used for a datum orientation with the glass substrate on the loading bracket; and the second stoppers are used to fix the glass substrate on the loading bracket by the second stoppers moving on the loading bracket.

11. The pick-and-place device for the glass substrate according to claim 10, wherein the loading bracket is provided with a plurality of air cushions, and the air cushions are used to suck and fix the glass substrate when picking or placing the glass substrate.

12. The pick-and-place device for the glass substrate according to claim 11, wherein the air cushions are further used to form an air suspension between the glass substrate and the loading bracket when the second stoppers move on the loading bracket.

13. The pick-and-place device for the glass substrate according to claim 10, wherein the second stoppers disposed on the corresponding end opposite to the first stoppers are used to fix the glass substrate on the loading arms by a movement in a parallel direction of the loading arms.

14. The pick-and-place device for the glass substrate g to claim 13, wherein each side of the two loading arms is provided with one of the second stoppers, the second stoppers are disposed on the middle of the first stopper and the second stopper corresponding to the first stopper.

15. The pick-and-place device for the glass substrate g to claim 13, wherein each side of the two loading arms is provided with at least two of the second stoppers, and the second stoppers are equidistantly disposed between the first stopper and the second stopper corresponding to the first stopper.

16. The pick-and-place device for the glass substrate according to claim 10, wherein both of the two loading arm are provided with the air cushions, and the air cushions are equidistantly disposed between the first stopper and the second stopper corresponding to the first stopper.

17. The pick-and-place device for the glass substrate according to claim 10, wherein each side of the two loading arms close to the left or right edges of the glass substrate is correspondingly provided with the second stoppers.

18. The pick-and-place device for the glass substrate according to claim 17, wherein the second stoppers disposed on the side edges of the loading arms are used to fix the glass substrate on the loading arms by a movement in a perpendicular direction to that of the loading arms.

* * * * *